US008233830B2

(12) United States Patent
Wu

(10) Patent No.: US 8,233,830 B2

(45) Date of Patent: Jul. 31, 2012

(54) POLYPYRROLE CONTAINING INTERMEDIATE TRANSFER COMPONENTS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 660 days.

(21) Appl. No.: 12/360,307

(22) Filed: Jan. 27, 2009

(65) Prior Publication Data

US 2010/0190008 A1 Jul. 29, 2010

(51) Int. Cl.
*G03G 15/14* (2006.01)
*B32B 9/04* (2006.01)

(52) U.S. Cl. ..................... 399/302; 252/500; 428/411.1; 526/258; 548/564

(58) Field of Classification Search ............... 428/411.1; 548/664
See application file for complete search history.

(56) References Cited

U.S. PATENT DOCUMENTS

| | | | | |
|---|---|---|---|---|
| 4,568,483 | A * | 2/1986 | Naarmann et al. | 252/500 |
| 5,120,807 | A * | 6/1992 | Wei et al. | 526/204 |
| 5,487,707 | A | 1/1996 | Sharf et al. | |
| 6,318,223 | B1 | 11/2001 | Yu et al. | |
| 6,397,034 | B1 | 5/2002 | Tarnawskyj et al. | |
| 6,440,515 | B1 | 8/2002 | Thornton et al. | |
| 6,489,020 | B1 * | 12/2002 | Caruthers, Jr. et al. | 428/327 |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 2003/0144388 | A1 | 7/2003 | Swift et al. | |
| 2004/0144961 | A1 * | 7/2004 | Srinivas | 252/500 |
| 2004/0179871 | A1 | 9/2004 | Fukuda | |
| 2004/0242792 | A1 * | 12/2004 | Sotzing | 525/326.1 |
| 2005/0095437 | A1 | 5/2005 | Furuya et al. | |
| 2006/0002747 | A1 * | 1/2006 | Goodman et al. | 399/302 |
| 2006/0269864 | A1 * | 11/2006 | Tarnawskyj et al. | 430/124 |
| 2010/0190007 | A1 | 7/2010 | Wu | |
| 2010/0190956 | A1 | 7/2010 | Wu | |

FOREIGN PATENT DOCUMENTS

WO WO 2004107359 A1 * 12/2004

OTHER PUBLICATIONS

Jin Wu, U.S. Appl. No. 12/200,074 entitled Hydrophobic Carbon Black Intermediate Transfer Components, filed Aug. 28, 2008.
Jin Wu, U.S. Appl. No. 12/200,111 entitled Hydrophobic Polyetherimide/Polysiloxane Copolymer Intermediate Transfer Components, filed Aug. 28, 2008.
Jin Wu et al., U.S. Appl. No. 12/200,147 entitled Coated Seamed Transfer Member, filed Aug. 28, 2008.
Jin Wu et al., U.S. Appl. No. 12/200,179 entitled Coated Transfer Member, filed Aug. 28, 2008.
Jin Wu, U.S. Appl. No. 12/129,995, entitled Polyimide Intermediate Transfer Components, filed May 30, 2008.
Jin Wu, U.S. Appl. No. 12/181,354, entitled Core Shell Intermediate Transfer Components, filed Jul. 29, 2008.
Jin Wu, U.S. Appl. No. 12/181,409, entitled Treated Carbon Black Intermediate Transfer Components, filed Jul. 29, 2008.

* cited by examiner

*Primary Examiner* — Harold Pyon
*Assistant Examiner* — Katie L Hammer
(74) *Attorney, Agent, or Firm* — Eugene O. Palazzo

(57) ABSTRACT

An intermediate transfer media, such as a belt, that includes a polypyrrole associated with, attached to, and more specifically, chemically attached to a carbon black.

24 Claims, No Drawings

POLYPYRROLE CONTAINING INTERMEDIATE TRANSFER COMPONENTS

CROSS REFERENCE TO RELATED APPLICATIONS

Copending U.S. application Ser. No. 12/360,190, U.S. Patent Publication No. 20100190956, on Polyaniline Viologen Charge Transfer Complexes Containing Intermediate Transfer Members, filed Jan. 27, 2009, the disclosure of which is totally incorporated herein by reference, illustrates an intermediate transfer member comprised of a substrate and a polyaniline viologen charge transfer complex.

Copending U.S. application Ser. No. 12/360,324, U.S. Publication No. 20100190007 on Nano Diamond Containing Intermediate Transfer Members, filed Jan. 27, 2009, the disclosure of which is totally incorporated herein by reference, illustrates an intermediate transfer member comprised of a nano diamond.

Illustrated in U.S. application Ser. No. 12/200,111, U.S. Publication No. 20100055445, filed Aug. 28, 2008, entitled Hydrophobic Polyetherimide/Polysiloxane Copolymer intermediate Transfer Components, the disclosure of which is totally incorporated herein by reference, is an intermediate transfer member comprised of a substrate comprising a polyetherimide polysiloxane copolymer.

Illustrated in U.S. application Ser. No. 12/200,147, U.S. Publication No. 20100055328, filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,074, U.S. Publication No. 20100055463, filed Aug. 28, 2008, entitled Hydrophobic Carbon Black Intermediate Transfer Components, the disclosure of which is totally incorporated herein by reference, is an intermediate transfer member comprised of a substrate comprising a carbon black surface treated with a poly(fluoroalkyl acrylate).

Illustrated in U.S. application Ser. No. 12/200,179, U.S. Publication No. 20100051171, filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 12/129,995, U.S. Publication No. 20090297232, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of from about 175° C. to about 290° C. over a period of time of from about 10 minutes to about 120 minutes.

Illustrated in U.S. application Ser. No. 12/181,354, U.S. Publication No. 20100028700, filed Jul. 29, 2008, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, now U.S. Pat. No. 7,738,824, filed Jul. 29, 2008, entitled Treated Carbon Black Intermediate Transfer Components, the disclosure of which is totally incorporated herein by reference, is an intermediate transfer member comprised of a substrate comprising a poly(vinylalkoxysilane) surface treated carbon black.

BACKGROUND

Disclosed are intermediate transfer members, and more specifically, intermediate transfer members useful in transferring a developed image in an electrostatographic, for example xerographic, including digital, image on image, and the like, machines or apparatuses and printers. In embodiments, there are selected intermediate transfer members comprised of surface treated carbon black, or more specifically, wherein a carbon black and a polypyrrole (PPy) are subjected to an in situ polymerization forming a polypyrrole grafted carbon black that is subsequently dispersed or mixed with a polymeric solution, such as a polyamic acid solution, to thereby provide intermediate transfer components like belts with a tunable preselected resistivity, where the polymeric solution is, for example, polyamic acid solution as illustrated in copending applications U.S. application Ser. No. 12/129,995, U.S. application Ser. No. 12/181,354, and U.S. application Ser. No. 12/181,409, the disclosures of which are totally incorporated herein by reference.

A number of advantages are associated with the intermediate transfer member, such as a belt (ITB) of the present disclosure, such as a tunable resistivity by, for example, the loading or amount of the PPy-grafted carbon black, the PPy grafting amount with a fixed loading, or both, where the surface resistivity is readily tuned to, for example, from about $10^8$ to $10^{13}$ ohm/sq; excellent dimensional stability; acceptable conductivities; a variety of formulation latitudes for the disclosed ITB as compared to an ITB with an untreated carbon black; ITB humidity insensitivity for extended time periods; excellent dispersability in a polymeric solution; low and acceptable surface friction characteristics; and simplified economic methods for ITB formation.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member which ultimately can lead to less than complete toner transfer resulting in low resolution images on the image receiving substrate, and image deterioration. When the image is in color, the image can additionally suffer from color shifting and color deterioration.

It is desired that the intermediate transfer member have a controlled resistivity, wherein the resistivity is substantially unaffected by changes in humidity, temperature, bias field, and operating time. In addition, a controlled resistivity is of value so that a bias field can be established for electrostatic transfer. Also, it is of value that the intermediate transfer member not be too conductive as air breakdown may occur, and that the resistivity thereof be reproducibly tuned, that is for example, where the resistivity of the transfer member can be selected prior to its incorporation into a xerographic apparatus.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor or unacceptable antistatic properties and poor or unacceptable mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

In addition, the ionic additives themselves are sensitive to changes in temperature, humidity, and operating time. These sensitivities often limit the resistivity range. For example, when ionic additives are present, the resistivity usually decreases by up to two orders of magnitude or more as the humidity increases from about 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

A number of the known ITB formulations apply carbon black (CB) or polyaniline as the conductive species; however, this has some limitations. For example, polyaniline is readily oxidized and results in loss of conductivity, its thermal stability is usually limited to about 200° C., and it begins to lose its conductivity at above 200° C. Also, it can be difficult to prepare carbon black based ITBs with consistent resistivity since the required loadings reside on the vertical part of the percolation curve.

Therefore, it is desired to provide a controlled resistivity tunable intermediate transfer member, which has excellent transfer capabilities, possesses excellent humidity insensitivity characteristics leading to high copy quality where developed images with minimal resolution issues can be obtained. It is also desired to provide a weldable intermediate transfer belt that may not, but could, have puzzle cut seams, and instead has a weldable seam, thereby providing a belt that can be manufactured without labor intensive steps, such as manually piecing together the puzzle cut seam with fingers, and without the lengthy high temperature and high humidity conditioning steps. In addition, with the selection of the disclosed polypyrrole-grafted carbon black as the conductive filler, the resistivity of the intermediate transfer member like a belt (ITB) can be reproducibly tuned to desired levels where, for example, as the amount of the PPy grafted onto the carbon black surface is increased, the higher the surface resistivity.

REFERENCES

Illustrated in U.S. Pat. No. 7,031,647 is an imageable seamed belt containing a lignin sulfonic acid doped polyaniline.

Illustrated in U.S. Pat. No. 7,139,519, the disclosure of which is totally incorporated herein by reference, is an intermediate transfer belt comprising a belt substrate comprising primarily at least one polyimide polymer; and a welded seam.

Illustrated in U.S. Pat. No. 7,130,569, the disclosure of which is totally incorporated herein by reference, is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515, the disclosures of which are totally incorporated herein by reference.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

In embodiments, there is disclosed an intermediate transfer member comprised of a substrate comprising surface carbon black treated with a polypyrrole; a transfer media comprised of carbon black having chemically attached thereto a polypyrrole; a transfer media wherein the polypyrrole is attached or chemically bonded to the carbon black surface; a transfer media wherein the polypyrrole is subjected to an in situ polymerization; an intermediate transfer member, such as an intermediate belt comprised of a substrate comprising a polypyrrole treated carbon black, that is, for example, where the polypyrrole is attached to the surface of the carbon black; a transfer member comprised of a polypyrrole grafted carbon black commercially available from Eeonyx Corporation, Pinole, Calif., as the Eeonomer series, like Eeonomer® 50F (0 percent of PPy), 100F (about 11.5 percent of PPy), 250F (about 24.25 percent of PPy), 300F (about 30 percent of PPy) and 350F (about 40 percent of PPy), and where the intermediate transfer member carbon black selected possesses a dibutyl phthalate (DBP) absorption of from about 10 to about 500 milliliters/gram (CB structure is measured by dibutyl phthalate absorption from the voids within the carbon black); an intermediate transfer member wherein the surface treated carbon black possesses a B.E.T. surface area of from about 100 to about 500 $m^2$/gram; an intermediate transfer member wherein the carbon black possesses a DBP absorption of from about 60 to about 300 milliliters/gram; an intermediate transfer belt where there is effected the in situ polymerization and deposition of polypyrrole (PPy) onto carbon black, and where the resulting polypyrrole-grafted carbon black is dispersed in a polymeric solution such as solutions of a polyimide, a polycarbonate, polyvinylidene fluoride (PVDF), poly(ethylene terephthalate) (PET), poly(butylene terephthalate) (PBT), poly(ethylene naphthalate) (PEN), poly(ethylene-co-tetrafluoroethylene) copolymer, or blends thereof to thereby further obtain functional intermediate transfer members with tunable resistivities.

The polypyrrole selected for the intermediate transfer member is represented, for example, by the following formulas/structures

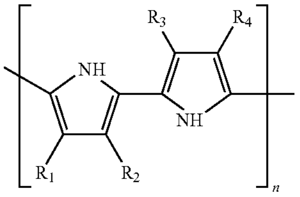

wherein each $R_1$, $R_2$, $R_3$ and $R_4$ is independently at least one of hydrogen and alkyl, wherein alkyl contains, for example from about 1 to about 18 carbon atoms, from 1 to about 12 carbon atoms, from 1 to about 8 carbon atoms; from 1 to about 6 carbon atoms; and n is the degree or amount of polymerization, and in embodiments where n is, for example, a number of from about 2 to about 300, from about 2 to about 400, from about 2 to about 500, from about 10 to about 300, from about 20 to about 200, from about 20 to about 100, from about 25 to about 95, from about 100 to about 200, from about 150 to about 250, or other suitable numbers.

Specific examples of polypyrroles that can be selected for attachment to the carbon black, including especially the surface thereof, are polypyrrole, poly(3-hexyl pyrrole), poly(3-octyl pyrrole), poly(3,4-dimethyl pyrrole), or poly(3,4-dihexyl pyrrole) with, in embodiments, a degree of polymerization of from about 10 to about 50, and where the polypyrrole is present in an amount of, for example, from about 0.1 to about 80, from about 5 to about 60, or from about 10 to about 40 weight percent of the PPy (polypyrrole) grafted carbon black.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image, and to form a developed image on the charge retentive surface; a weldable intermediate transfer belt to transfer the developed image from the charge retentive surface to a substrate, and a fixing component.

DETAILED DESCRIPTION

Aspects of the present disclosure relate to an intermediate transfer member comprised of a substrate comprising a carbon black, which is treated with a polypyrrole, such as polypyrrole; a transfer media comprised of carbon black having chemically attached thereto a polypyrrole; and an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and an intermediate transfer belt to transfer the developed image from the charge retentive surface to a substrate, wherein the intermediate transfer belt is comprised of a substrate comprising a polypyrrole attached to a carbon black.

Carbon black can be considered to be elemental carbon in the form of near spherical colloidal sized particles, and which particles coalesce into three dimensional particulates referred to as aggregates.

In embodiments, the carbon black surface is composed, for example, of graphitic planes with oxygen and hydrogen at the edges as represented by

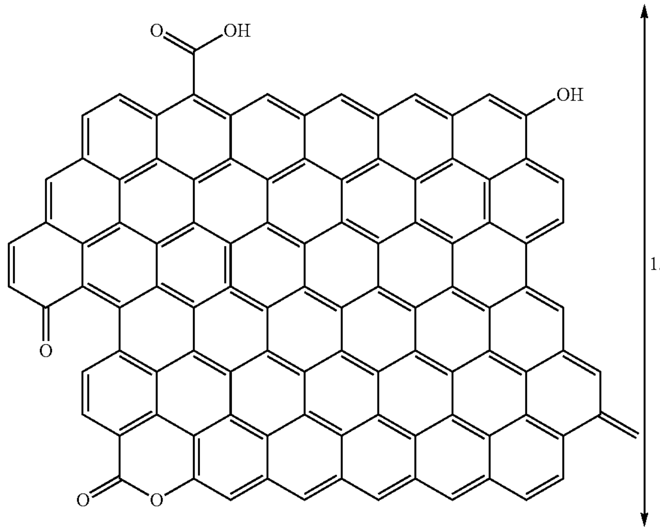

1.5-2.0 Nanometers.

Carbon black surface groups can be formed by oxidation with an acid or with ozone, and where there is absorbed or chemisorbed thereto oxygen groups from, for example, carboxylates, phenols, and the like. The carbon surface is essentially inert to most organic reaction chemistry except primarily for oxidative processes, and free radical reactions.

Disclosed herein in embodiments is the chemical attachment of a polypyrrole onto carbon, such as carbon black surfaces, by in situ polymerization. Specifically, for example, carbon black is mixed with a pyrrole, or mixtures thereof in a suitable solvent such as water. In the presence of a catalyst, a polymerization initiator such as ammonium persulfate, potassium persulfate or $FeCl_3$, and heating such as heating from about 60° C. to about 90° C., the pyrrole is polymerized to form a polypyrrole. The weight ratio of carbon black and pyrrole is, for example, from about 20/80 to about 99/1, or from about 40/60 to about 90/10. The weight average molecular weight of the attached polypyrrole depends, for example, on both the pyrrole amount and the initiator amount. In general, the higher the pyrrole/initiator ratio, the higher the molecular weight of the polypyrrole. While the polymerization is in progress, a number of the polymer chains are terminated onto the carbon black surfaces by the absorbed or chemisorbed oxygen groups originating from carboxylates, phenols, and the like on the carbon black surface thereby resulting in the polypyrrole polymer being chemically attached onto the carbon black surface. Furthermore, as illustrated herein the chemically grafted polypyrrole carbon blacks are commercially available.

After curing by heating, the resulting functional intermediate transfer member exhibited a tunable surface resistivity of, for example, from about $10^5$ to about $10^9$ to about $10^{13}$ ohm/sq when the polypyrrole amount chemically grafted onto the carbon black surface varied from about 10 weight percent to about 25 weight percent to about 40 weight percent. As comparison, a similar intermediate transfer member with the same weight percent loading of the carbon black and without any PPy attached onto the surface thereof exhibited a too low surface resistivity of about $10^4$ ohm/square.

The conductivity of carbon black is dependent on a number of properties including its surface area and its structure. Generally, the larger the surface area, and the higher the structure, the more conductive the carbon black. Surface area can be measured by the B.E.T. (Brunauer Emmett Teller) with the nitrogen absorption surface area per unit weight of carbon black being a measurement of the primary particle size. Structure is a complex property that refers to the morphology of the primary aggregates of carbon black. It is a measure of both the number of primary particles comprising a primary aggregate, and the manner in which they are fused together. High structure carbon blacks are characterized by aggregates comprised of many primary particles with considerable branching and chaining, while low structure carbon blacks are characterized by compact aggregates comprised of a few primary particles. Structure can be measured by dibutyl phthalate (DBP) absorption by the voids within carbon blacks. The higher the structure, the more the voids, and the higher is the DBP absorption.

Examples of carbon blacks that may be treated in accordance with embodiments of the present disclosure include VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=105 ml/g), BLACK PEARLS® 880 (B.E.T. surface area=240 $m^2/g$, DBP absorption=106 ml/g), BLACK PEARLS® 800 (B.E.T. surface area=230 $m^2/g$, DBP absorption=68 ml/g), BLACK PEARLS® L (B.E.T. surface area=138 $m^2/g$, DBP absorption=61 ml/g), BLACK PEARLS® 570 (B.E.T. surface area=110 $m^2/g$, DBP absorption=114 ml/g), BLACK PEARLS® 170 (B.E.T. surface area=35 $m^2/g$, DBP absorption=122 ml/g), VULCAN® XC72 (B.E.T. surface area=254 $m^2/g$, DBP absorption=176 ml/g), VULCAN® XC72R (fluffy form of VULCAN® XC72), VULCAN® XC605, VULCAN® XC305, REGAL® 660 (B.E.T. surface area=112 $m^2/g$, DBP absorption=59 ml/g), REGAL® 400 (B.E.T. surface area=96 $m^2/g$, DBP absorption=69 ml/g), and REGAL® 330 (B.E.T. surface area=94 $m^2/g$, DBP absorption=71 ml/g).

The weight ratio of carbon black and polymer is, for example, from about 20/80 to about 99.9/0.1, from about 40/60 to about 95/5, or from about 60/40 to about 90/10.

The treated or modified carbon black as illustrated herein is usually formed into a dispersion with a number of materials, such as a polyamic acid solution formed from a polyimide precursor. With suitable known milling processes, uniform dispersions of the polypyrrole treated carbon blacks can be obtained, and subsequently, the dispersions can be applied to or coated on a substrate such as a glass plate using known draw bar coating methods. The resulting film or films can be dried at high temperatures, such as from about 100° C. to about 400° C., from about 150° C. to about 300° C., and from about 175° C. to about 200° C., for a sufficient period of time, such as for example, from about 20 to about 180 minutes, or from about 75 to about 100 minutes while remaining on the glass plate. After drying and cooling to room temperature, the film or films on the glass plate or separate glass plates are immersed into water overnight, about 18 to 23 hours, and subsequently, the 50 to 150 microns thick film or films formed are released from the glass resulting in an intermediate transfer member or members as disclosed herein.

Examples of suitable polyamic acid solutions that can be selected for the treated carbon black mixtures include, for example, rapidly cured polyimide polymers such as VTEC™ PI 1388, 080-051, 851, 302, 203, 201 and PETI-5, all available from Richard Blaine International, Incorporated, Reading, Pa. These polymers, which can be considered thermosetting polyimides, are cured at suitable temperatures, and more specifically, from about 180° C. to about 260° C. over a short period of time, such as, for example, from about 10 to about 120, and from about 20 to about 60 minutes; possess, for example, a number average molecular weight of from about 5,000 to about 500,000, or from about 10,000 to about 100,000; and a weight average molecular weight of from about 50,000 to about 5,000,000, or from about 100,000 to about 1,000,000. There can also be selected for the carbon black mixtures thermosetting polyimide precursors that are cured at higher temperatures (above 300° C.) than the VTEC™ PI polyimide precursors, and which precursors include, for example, PYRE-M.L® RC-5019. RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, commercially available from E.I. DuPont, Wilmington, Del.

The conductive polypyrrole polymer treated carbon black component of the present disclosure can also be incorporated into or added to thermoplastic materials such as a polyimide, a polycarbonate, a polyvinylidene fluoride (PVDF), a poly (butylene terephthalate) (PBT), poly(ethylene terephthalate) (PET), poly(ethylene naphthalate) (PEN), a poly(ethylene-co-tetrafluoroethylene) copolymer, and mixtures thereof.

Examples of specific selected thermoplastic polyimides are KAPTON® KJ, commercially available from E.I. DuPont, Wilmington, Del., as represented by

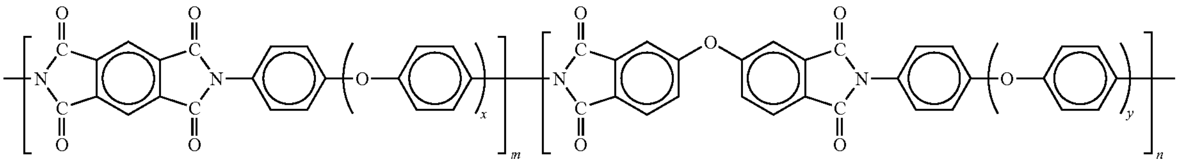

wherein x is equal to 2; y is equal to 2; m and n are from about 10 to about 300; and IMIDEX®, commercially available from West Lake Plastic Company, as represented by

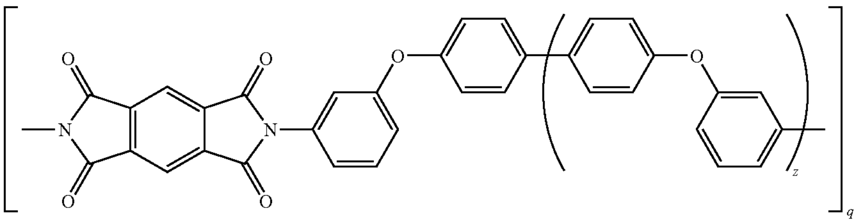

wherein z is equal to 1, and q is from about 10 to about 300.

Examples of additional components present in the intermediate transfer member are a number of known conductive components and polymers, such as polyanilines. In embodiments, the polyaniline component has a relatively small particle size of, for example, from about 0.5 to about 5, from about 1.1 to about 2.3, from about 1.2 to about 2, from about 1.5 to about 1.9, or about 1.7 microns.

Specific examples of polyanilines selected for the transfer member, such as an ITB, are PANIPOL™ F, commercially available from Panipol Oy, Finland; and a lignosulfonic acid grafted polyaniline.

The disclosed intermediate transfer members are, in embodiments, weldable, that is the seam of the member, like a belt, is weldable, and more specifically, may be ultrasonically welded to produce a seam. The surface resistivity of the disclosed intermediate transfer member is, for example, from about $10^5$ to about $10^{13}$ ohm/square or from about $10^9$ to about $10^{12}$ ohm/square. The sheet resistivity of the intermediate transfer weldable member is, for example, from about $10^5$ to about $10^{13}$ ohm/square, or from about $10^9$ to about $10^{12}$ ohm/square.

The intermediate transfer members illustrated herein, like intermediate transfer belts, can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. The circumference of the intermediate transfer member, especially as it is applicable to a film or a belt configuration, is, for example, from about 250 to about 2,500, from about 1,500 to about 2,500, or from about 2,000 to about 2,200 millimeters with a corresponding width of, for example, from about 100 to about 1,000, from about 200 to about 500, or from about 300 to about 400 millimeters.

Specific embodiments will now be described in detail. These examples are intended to be illustrative, and the disclosure is not limited to the materials, conditions, or process parameters set forth in these embodiments. All parts are percentages by weight of total solids unless otherwise indicated.

COMPARATIVE EXAMPLE 1

Preparation of ITB with a Nontreated Carbon Black:

The EEONOMER® 50F carbon black (CB), obtained from Eeonyx Corporation, Pinole, Calif. was mixed with the polyamic acid solution, VTEC™ PI 1388 (PI, 20 weight percent solids in NMP obtained from Richard Blaine International, Incorporated), at varying weight ratios [CB/PI=5/95 in Comparative Example 1 (A); CB/PI=6/94 in Comparative Example 1 (B); and CB/PI=7/93 in Comparative Example 1 (C)]. By ball milling with 2 millimeter stainless shot at 160 rpm overnight, about 23 hours, uniform dispersions were obtained, and then coated on glass plates using a draw bar coating method. Each respective film was dried at 100° C. for 20 minutes, and then at 204° C. for an additional 20 minutes while remaining on the glass plate. After drying and cooling to room temperature, about 23° to 25° C., the separate glass plate films were immersed into water overnight, about 23 hours, and the resulting individual 50 micron thick freestanding films were released from the individual glass plates.

EXAMPLE I

Preparation of ITB with Treated Carbon Black:

The polypyrrole (PPy) treated EEONOMER® 100F carbon black (PPy-g-CB ratio in weight percent of 11.5/88.5), obtained from Eeonyx Corporation, Pinole, Calif., was mixed with the polyamic acid solution, VTEC™ PI 1388 (PI, 20 weight percent solids in NMP obtained from Richard Blaine International, Incorporated), in the weight ratio of 6/94. By ball milling with 2 millimeter stainless shot at 160 rpm overnight, about 23 hours, a uniform dispersion was obtained, followed by the coating thereof on a glass plate using a draw bar coating method. The obtained film was dried at 100° C. for 20 minutes, and then 204° C. for an additional 20 minutes while remaining on the glass plate. After drying and cooling to room temperature, the resulting film on the glass plate was immersed into water overnight, about 23 hours, and the resulting 50 micron thick freestanding film was released from the glass plate.

EXAMPLE II

The PPy treated EEONOMER® 250F carbon black (PPy-g-CB=24.25/75.75), obtained from Eeonyx Corporation, Pinole, Calif., was mixed with the polyamic acid solution, VTEC™ PI 1388 (PI, 20 weight percent solids in NMP obtained from Richard Blaine International, Incorporated), in the weight ratio of 5/95. By ball milling with 2 millimeter stainless shot at 160 rpm overnight, about 23 hours, a uniform dispersion was obtained; followed by the coating thereof on a glass plate using a draw bar coating method. The obtained film was dried at 100° C. for 20 minutes, and then 204° C. for an additional 20 minutes while remaining on the glass plate. After drying and cooling to room temperature, the resulting film on the glass plate was immersed into water overnight, about 23 hours, and the resulting 50 micron thick freestanding film was released from the glass plate.

EXAMPLE III

The PPy treated EEONOMER® 250F carbon black (PPy-g-CB=24.25/75.75), obtained from Eeonyx Corporation, Pinole, Calif. was mixed with the polyamic acid solution, VTEC™ PI 1388 (PI, 20 weight percent solids in NMP obtained from Richard Blaine International, Incorporated) in the weight ratio of 6/94. By ball milling with 2 millimeter stainless shot at 160 rpm overnight, about 23 hours, a uniform dispersion was obtained, followed by the coating thereof on a glass plate using a draw bar coating method. The obtained film was dried at 100° C. for 20 minutes, and then 204° C. for an additional 20 minutes while remaining on the glass plate. After drying and cooling to room temperature, the resulting film on the glass plate was immersed into water overnight, about 23 hours, and the resulting 50 micron thick freestanding film was released from the glass plate automatically.

EXAMPLE IV

The PPy treated EEONOMER® 250F carbon black (PPy-g-CB=24.25/75.75), obtained from Eeonyx Corporation, Pinole, Calif. was mixed with the polyamic acid solution, VTEC™ PI 1388 (PI, 20 weight percent solids in NMP obtained from Richard Blaine International, Incorporated) in the weight ratio of 7/93. By ball milling with 2 millimeter stainless shot at 160 rpm overnight, about 23 hours, a uniform dispersion was obtained, followed by the coating thereof on a glass plate using a draw bar coating method. The obtained film was dried at 100° C. for 20 minutes, and then 204° C. for an additional 20 minutes while remaining on the glass plate. After drying and cooling to room temperature, the resulting film on the glass plate was immersed into water overnight, about 23 hours, and the resulting 50 micron thick freestanding film was released from the glass plate.

EXAMPLE V

The PPy treated EEONOMER® 350F carbon black (PPy-g-CB=40/60), obtained from Eeonyx Corporation, Pinole, Calif., was mixed with the polyamic acid solution, VTEC™ PI 1388 (PI, 20 weight percent solids in NMP obtained from Richard Blaine International, Incorporated) in the weight ratio of 6/94. By ball milling with 2 millimeter stainless shot at 160 rpm overnight, about 23 hours, a uniform dispersion was obtained, followed by the coating thereof on a glass plate using a draw bar coating method. The obtained film was dried at 100° C. for 20 minutes, and then at 204° C. for an additional 20 minutes while remaining on the glass plate. After drying and cooling to room temperature, about 23° C. to about 25° C. throughout the Examples, the resulting film on the glass plate was immersed into water overnight, about 23 hours, and the resulting 50 micron thick freestanding film was released from the glass plate automatically.

Surface Resistivity Measurement

The ITB devices of Comparative Examples 1 (A), 1 (B) and 1 (C), and Examples I, II, III, IV and V were measured for surface resistivity (under 500V, averaging four measurements at varying spots, 72° F./65 percent room humidity) using a High Resistivity Meter (Hiresta-Up MCP-HT450 available from Mitsubishi Chemical Corp.), and the results are provided in Table 1.

TABLE 1

| ITB Devices | Surface Resistivity (ohm/sq) |
|---|---|
| Comparative Example 1 (A), CB/PI = 5/95 | ~$10^{14}$ |
| Comparative Example 1 (B), CB/PI = 6/94 | ~$10^{4}$ |
| Comparative Example 1 (C), CB/PI = 7/93 | ~$10^{4}$ |

TABLE 1-continued

| ITB Devices | Surface Resistivity (ohm/sq) |
|---|---|
| Example I, PPy-g-CB/PI = 6/94, where PPy/CB = 11.5/88.5 | $(1.00 \pm 0.18) \times 10^{5}$ |
| Example II, PPy-g-CB/PI = 5/95, where PPy/CB = 24.25/75.75 | $(1.31 \pm 0.13) \times 10^{13}$ |
| Example III, PPy-g-CB/PI = 6/94, where PPy/CB = 24.25/75.75 | $(2.79 \pm 0.85) \times 10^{9}$ |
| Example IV, PPy-g-CB/PI = 7/93, where PPy/CB = 24.25/75.75 | $(6.96 \pm 0.57) \times 10^{8}$ |
| Example V, PPy-g-CB/PI = 6/94, where PPy/CB = 40/60 | $(3.25 \pm 0.32) \times 10^{13}$ |

For the comparative ITB devices with nontreated carbon black, a small change in the CB loading percentage had an adverse effect on surface resistivity when this resistivity was either too conductive or not conductive enough primarily because the required CB loadings were positioned on the vertical part of the percolation curve, which presented a problem for achieving manufacturing robustness. In contrast, the disclosed ITB device with PPy treated carbon black had a surface resistivity within a more suitable range of from about $10^5$ to about $10^{13}$ ohm/square.

Specifically, the resulting functional intermediate transfer member exhibited a tunable surface resistivity of from about $10^5$ (Example I) to about $10^9$ (Example III) to about $10^{13}$ Ω/square (Example V) when the polypyrrole amount chemically grafted onto the carbon black surface varied from about 10 percent to about 25 percent to about 40 percent, and when the CB loading was fixed at 6 weight percent. As comparison, the intermediate transfer member with 6 weight percent of the carbon black itself without any PPy attached onto the surface exhibited a low surface resistivity of $10^4$ ohm/square.

With the disclosed polypyrrole-grafted carbon black as the conductive filler, the resistivity of the ITB can be reproducibly tuned to desired levels. In addition to controlling the surface resistivity by the filler loading as in Examples II, III and IV, where usually the higher the PPy-grafted CB loading, the lower the surface resistivity, which is unlike the non-treated CB as in Comparative Examples 1 (A), 1 (B) and 1 (C), the surface resistivity of the disclosed intermediate transfer members can also be controlled by the PPy grafting amount in the filler as in Examples I, III and V, where usually the more PPy grafted onto the CB surface, the higher the surface resistivity.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a substrate containing a developed image thereon and which substrate comprises a carbon black which is surface treated with a polypyrrole wherein said polypyrrole is grafted to said carbon black and said polypyrrole is represented by

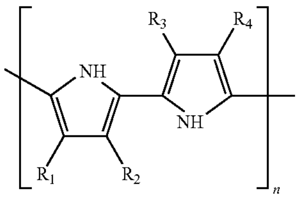

wherein $R_1$, $R_2$, $R_3$ and $R_4$ are independently at least one of hydrogen and alkyl, and n represents the degree of polymerization of from about 2 to about 400, and wherein said developed image is transferred from said intermediate transfer member to a receiver.

2. An intermediate transfer member in accordance with claim 1 wherein $R_1$, $R_2$, $R_3$ and $R_4$ are alkyl.

3. An intermediate transfer member in accordance with claim 1 wherein $R_1$, $R_2$, $R_3$ and $R_4$ each is a lower alkyl with from about 1 to about 6 carbon atoms, and n is from about 20 to about 100.

4. An intermediate transfer member in accordance with claim 1 wherein said polypyrrole is poly(3-hexyl pyrrole), poly(3-octyl pyrrole), poly(3,4-dimethyl pyrrole), or poly(3,4-dihexyl pyrrole).

5. An intermediate transfer member in accordance with claim 1 wherein the weight ratio of said carbon black to said polypyrrole is from about 20/80 to about 99.9/0.1.

6. An intermediate transfer member in accordance with claim 1 wherein the weight ratio of said carbon black to said polypyrrole is from about 40/60 to about 95/5, and said carbon black surface treated with said polypyrrole is present in an amount of from about 1 to about 30 percent by weight based on the weight of total solids.

7. An intermediate transfer member in accordance with claim 1 wherein the weight ratio of said carbon black to said polypyrrole is from about 60/40 to about 90/10, and said carbon black surface treated with said polypyrrole is present in an amount of from about 3 to about 15 percent by weight based on the weight of total solids.

8. An intermediate transfer member in accordance with claim 1 wherein said member is a weldable belt.

9. An intermediate transfer member in accordance with claim 1 further including a polyaniline present in an amount of from about 1 to about 30 percent by weight based on the weight of total solids.

10. An intermediate transfer member in accordance with claim 9 wherein said polyaniline is present in an amount of from about 3 to about 15 percent by weight based on the weight of total solids.

11. An intermediate transfer member in accordance with claim 1 wherein said member has a surface resistivity of from about $10^5$ to about $10^{13}$ ohm/square.

12. An intermediate transfer member in accordance with claim 11 wherein said surface resistivity is from about $10^9$ to about $10^{12}$ ohm/square.

13. An intermediate transfer member in accordance with claim 1 further comprising an outer release layer positioned on said substrate.

14. An intermediate transfer member in accordance with claim 13 wherein said release layer comprises a poly(vinyl chloride).

15. An intermediate transfer member in accordance with claim 1 wherein said intermediate transfer member has a circumference of from about 250 to about 2,500 millimeters.

16. An intermediate transfer member in accordance with claim 1 wherein said carbon black surface treated with said polypyrrole is dispersed in a polymer.

17. An intermediate transfer member in accordance with claim 16 wherein said polymer is selected from the group consisting of a polyimide, a polycarbonate, a polyvinylidene fluoride, a poly(butylene terephthalate), a poly(ethylene terephthalate), a poly(ethylene naphthalate), a poly(ethylene-co-tetrafluoroethylene), and mixtures thereof.

18. An intermediate transfer member in accordance with claim 1 wherein said carbon black possesses a B.E.T. surface area of from about 20 to about 1,000 $m^2$/gram, and wherein said carbon black possesses a DBP absorption of from about 10 to about 500 milliliters/gram.

19. An intermediate transfer member in accordance with claim 1 wherein said member is in the form of a flexible belt, and wherein said carbon black surface treated with said polypyrrole is present in an amount of from about 3 to about 10 weight percent.

20. An intermediate transfer member in accordance with claim 1 wherein $R_1$, $R_2$, $R_3$ and $R_4$ are hydrogen, and n is from about 2 to about 300.

21. An intermediate transfer member in accordance with claim 1 wherein $R_1$, $R_2$, $R_3$ and $R_4$ are alkyl with from about 1 to about 6 carbon atoms, and n is from about 25 to about 95.

22. An intermediate transfer member in accordance with claim 1 wherein said polypyrrole is poly(3-hexylpyrrole).

23. An intermediate transfer member in accordance with claim 1 wherein said polypyrrole is a polyalkylpyrrole.

24. An intermediate transfer member consisting of a substrate containing a developed toner image thereon and which substrate consists of a polypyrrole grafted to a carbon black and wherein said polypyrrole is represented by

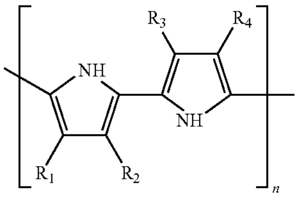

wherein $R_1$, $R_2$, $R_3$ and $R_4$ are independently at least one of hydrogen and alkyl, and n represents the degree of polymerization of from about 2 to about 400, and wherein said developed toner image is transferred from said intermediate transfer member to paper.

* * * * *